United States Patent
Cardei et al.

(10) Patent No.: US 11,776,163 B1
(45) Date of Patent: Oct. 3, 2023

(54) SYSTEMS, METHODS, AND APPARATUS FOR CORRECTING DESATURATION OF IMAGES WITH TRANSFORMED COLOR VALUES BY APPLING A MATRIX

(71) Applicant: Waymo LLC, Mountain View, CA (US)

(72) Inventors: Vlad Constantin Cardei, Mountain View, CA (US); Carl Warren Craddock, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 368 days.

(21) Appl. No.: 17/138,247

(22) Filed: Dec. 30, 2020

(51) Int. Cl.
*G06T 7/90* (2017.01)
*G06F 17/16* (2006.01)
*G06T 11/00* (2006.01)

(52) U.S. Cl.
CPC ................. *G06T 7/90* (2017.01); *G06F 17/16* (2013.01); *G06T 11/001* (2013.01)

(58) Field of Classification Search
CPC .......... G06T 7/90; G06T 11/001; G06F 17/16
See application file for complete search history.

(56) References Cited

U.S. PATENT DOCUMENTS

| | | | |
|---|---|---|---|
| 8,126,642 B2 | 2/2012 | Trepagnier et al. | |
| 9,442,487 B1 | 9/2016 | Ferguson et al. | |
| 9,654,751 B2 | 5/2017 | Doser et al. | |
| 9,911,242 B2 | 3/2018 | Sundaresan et al. | |
| 9,961,237 B2 | 5/2018 | Atkins | |
| 10,373,316 B2 | 8/2019 | Jales Costa et al. | |
| 10,757,384 B2 | 8/2020 | Douady-Pleven et al. | |
| 10,803,743 B2 | 10/2020 | Abari et al. | |
| 2013/0093915 A1* | 4/2013 | Zhang | H04N 23/88 382/167 |
| 2019/0098274 A1* | 3/2019 | Douady-Pleven | G06T 5/50 |
| 2019/0139268 A1* | 5/2019 | Pennig | G06T 7/90 |
| 2020/0154030 A1* | 5/2020 | Kiser | G06V 20/582 |
| 2020/0349685 A1 | 11/2020 | Andrivon et al. | |
| 2020/0377116 A1 | 12/2020 | Abrashov et al. | |
| 2020/0394472 A1 | 12/2020 | Jia et al. | |

OTHER PUBLICATIONS

Saito et al., "New Lane Detection Algorithm that Emulates Human Color Recognition", Journal of Robotics and Mechatronics, vol. 27, No. 4, pp. 382-391, Aug. 2015.
Pollarus et al., "Detection of landmarks by autonomous mobile robots using camera-based sensors in outdoor environments", IEEE Sensors Journal, pp. 1-1, Jul. 29, 2020.

* cited by examiner

*Primary Examiner* — Christopher Wait
(74) *Attorney, Agent, or Firm* — McDonnell Boehnen Hulbert & Berghoff LLP

(57) ABSTRACT

Systems, apparatus, and methods are presented for rendering color images. One method may include receiving first color values of a first image from a first image capture device. The first color values may represent colors in a first color space. The method also may include applying first color transformation information to the first color values to generate first transformed color values of the first image in a particular color space and applying desaturation information to the first transformed color values to generate first desaturated color values of the first image. Further, the method may include providing the first desaturated color values of the first image for rendering on a display device.

20 Claims, 6 Drawing Sheets

SYSTEMS, METHODS, AND APPARATUS FOR CORRECTING DESATURATION OF IMAGES WITH TRANSFORMED COLOR VALUES BY APPLING A MATRIX

BACKGROUND

This background description is provided for the purpose of generally presenting the context of the disclosure. Unless otherwise indicated herein, material described in this section is neither expressly nor impliedly admitted to be prior art to the present disclosure or the appended claims.

Autonomous vehicles may use various computing systems to aid in the transport of passengers from one location to another. Some autonomous vehicles may operate based on some initial input or continuous input from an operator, such as a pilot, driver, or passenger. Other systems, such as autopilot systems, may be used only when the system has been engaged, which permits the operator to switch from a manual mode (where the operator may exercise a high degree of control over the movement of the vehicle) to an autonomous mode (where the vehicle essentially drives itself) to modes that lie somewhere in between.

Such vehicles are typically equipped with various types of sensors in order to detect objects in the surrounding environment. For example, an autonomous vehicle may include light detection and ranging (lidar) sensors, radio detection and ranging (radar) sensors, sound navigation and ranging (sonar) sensors, image capture devices (e.g., cameras), and other sensor devices which detect and/or capture sensor data from the environment surroundings the vehicle. The vehicle and its associated computing systems may use the sensor data detected by the sensors to navigate through the environment and/or to provide information to the occupants of the vehicle.

The image capture devices of the vehicle may include image sensors for capturing images representing scenes of the environment. For instance, the image sensors may include arrays of complementary metal oxide semiconductor sensing elements or other types of light sensing elements. Each sensing element may receive a portion of light from the scene incident on the array. Each sensing element may then output a measure of the amount of light incident on the sensing element during an exposure time when the sensing element is exposed to the light from the scene. With this arrangement, images (e.g., an image frame) of the scene can be generated, where each pixel in an image indicates one or more raw color values (e.g., RGB values, etc.) based on outputs from the array of sensing elements.

The raw color values of the images may not be directly used for rendering images because the color responses of the sensing elements of the image capture devices may be different than the visual appearance of the colors in the scene. As a result, a color correction process may be performed to correct or adjust the raw color values generated by the image capture devices to represent the colors of the scene. For example, the color correction process may adjust the raw color values of the images so that the corrected color values may replicate the true colors of the scene. However, the color correction process may not convert the raw color values of the images captured by different image capture devices into colors values representative of the same color. For example, color differences may exist between images of a scene from different image capture devices. Thus, the corrected colors of the images captured by different image capture devices may be rendered with visible color differences.

SUMMARY

Systems, methods, and apparatus provide techniques to improve the functioning of computing systems of autonomous vehicles for rendering color images. The computing systems may receive image data representative of scenes captured by one or more image capture devices (e.g., one or more cameras). The computing system may compensate or correct the color information in the images to render accurate colors of the scene. Further, the computing system may compensate for color differences between images captured by different image capture devices so that colors may be reproduced substantially the same for each image. As a result, color images from different image capture devices may be rendered without visible differences for the same colors.

In one aspect, the present application describes a method. The method may include receiving first color values of a first image from a first image capture device. The first color values may represent colors in a first color space. The method also may include applying first color transformation information to the first color values to generate first transformed color values of the first image in a particular color space and applying desaturation information to the first transformed color values to generate first desaturated color values of the first image. Further, the method may include providing the first desaturated color values of the first image for rendering on a display device.

In another aspect, the present application describes an apparatus comprising a memory and at least one processor. The at least one processor may be configured to receive first color values of a first image from a first image capture device. The first color values may represent colors in a first color space. The at least one processor may also be configured to apply first color transformation information to the first color values to generate first transformed color values of the first image in a particular color space and apply desaturation information to the first transformed color values to generate first desaturated color values of the first image. Further, the at least one processor may be further configured to provide the first desaturated color values of the first image for rendering on a display device.

In still another aspect, a non-transitory computer-readable medium storing instructions is disclosed that, when the instructions are executed by one or more processors, causes the one or more processors to perform operations. The operations may include receiving first color values of a first image from a first image capture device. The first color values may represent colors in a first color space. The operations also may include applying first color transformation information to the first color values to generate first transformed color values of the first image in a particular color space and applying desaturation information to the first transformed color values to generate first desaturated color values of the first image. Further, the operations may include providing the first desaturated color values of the first image for rendering on a display device.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
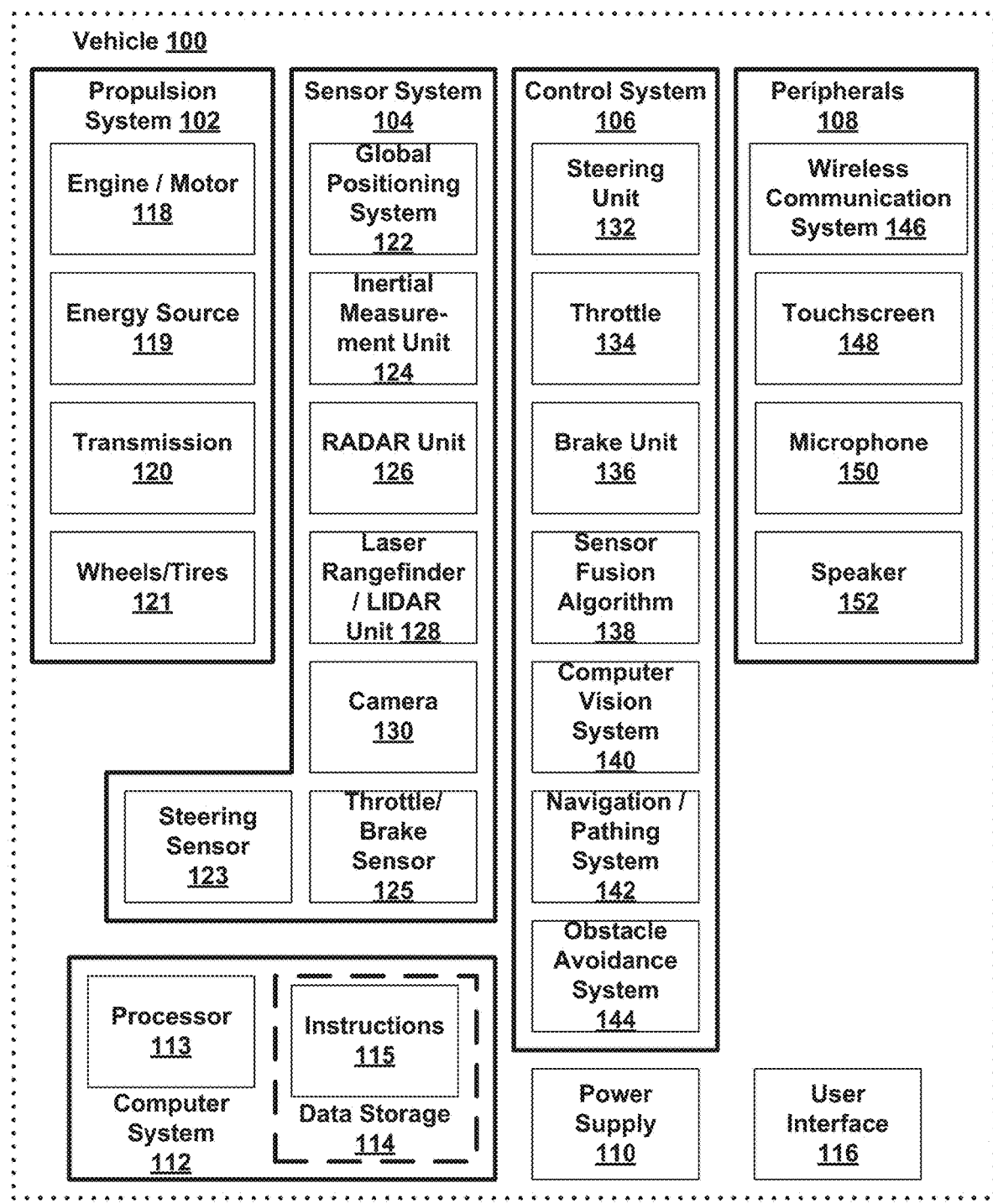
FIG. 1 is a functional block diagram illustrating systems of a vehicle, according to an example implementation.

Example systems, apparatus, and methods are described herein. It should be understood that the words "example," "exemplary," and "illustrative" are used herein to mean "serving as an example, instance, or illustration." Any implementation or feature described herein as being an "example," "exemplary," and/or "illustrative" is not necessarily to be construed as preferred or advantageous over other implementations or features. Thus, other embodiments can be utilized and other changes can be made without departing from the scope of the subject matter presented herein.

Accordingly, the example embodiments and implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

The present disclosure provides systems, apparatus, and methods that improve the functioning of computing systems of autonomous vehicles for rendering color images. The computing systems may receive image data representative of scenes captured by one or more image capture devices (e.g., cameras). The computing system may compensate or correct the color information in the images to render accurate colors of the scene. Further, the computing system may compensate for color differences between images captured by different image capture devices so that colors may be represented substantially the same for each image (i.e., the colors of an image for a first image capture device may be substantially the same as the colors of an image from a second image capture device). As a result, color images from different image capture devices may be rendered with substantially the same colors for a scene and without visible differences for the same colors.

Autonomous vehicles may navigate a path of travel without requiring a driver to provide guidance and control. In order to obey traffic regulations and avoid obstacles in the environment, a vehicle may utilize sensor data provided by a vehicle sensor system equipped with one or multiple types of sensors. For example, the sensors may include light detection and ranging (lidar) sensors, radio detection and ranging (radar) sensors, sound navigation and ranging (sonar) sensors, image capture devices (e.g., cameras), event capture devices (e.g., event detectors), microphone sensors, and other suitable sensors.

As the vehicle navigates, the sensors of the vehicle sensor system may be configured to capture or acquire sensor information (e.g., measurements) indicative of the vehicle's environment and provide the sensor information periodically or in a continuous manner to a computing device of the vehicle sensor system. For example, the sensor information may include one or multiple measurements of the environment captured at particular times during the operation of the sensors. Further, the sensors may provide the sensor information to the computing device in various formats, which may reflect changes in the environment. The computing device may use the sensor information from the sensors to provide instructions for operating the vehicle in an autonomous mode.

The sensor system of the vehicle may include one or more image capture devices (e.g., cameras) having image sensors configured to capture images of the environment in which the vehicle operates. The image capture devices may include a plurality of pixels or sensing elements configured in horizontal rows and/or vertical columns. The pixels of the image capture devices may be sampled to obtain pixel values or image data for constructing an image or image frame. In some examples, the image capture devices may have a rolling shutter configured to iteratively sample or scan the vertical columns and/or horizontal rows of the pixels.

The computing device may be configured to receive images captured by the image capture devices. The computing device may compensate or correct the color information in the images and generate color values representing accurate colors of a scene. The computing device may transform the color values of the images captured by image capturing devices into colors representing approximately the same colors in a particular color space. For example, the computing device may transform the raw color values received from the image capture devices into transformed color values representing colors in a standard or canonical color space (e.g., a standard RGB color space). Further, the image data of the images from the image capture devices may be desaturated to generate desaturated image data. For example, the computing device may desaturate the transformed color values of the images into desaturated color values. The computing device may provide the desaturated color values for rendering the colors of the images of the scene. As a result, images captured by the image capture devices may be rendered with minimal differences between the same colors in each image.

Example systems, apparatus, and methods that implement the techniques described herein will now be described in greater detail with reference to the figures. Generally, an example system may be implemented in or may take the form of a sensor or computer system of an automobile. However, a system may also be implemented in or take the form of other systems for vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating systems of an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use one or more sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include various subsystems, such as a propulsion system 102, a sensor system 104, a control system 106, one or more peripherals 108, a power supply 110, a computer or computing system 112, a data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within implementations. For instance, the control system 106 and computer system 112 may be combined into a single system that operates the vehicle 100 in accordance with various operations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and can correspond to one or a combination of an internal combustion engine, an electric motor, a steam engine, or Stirling engine, among other possible options. For instance, in some implementations, the propulsion system 102 may include multiple types of engines and/or motors, such as a gasoline engine and an electric motor.

The energy source 119 represents a source of energy that may, in full or in part, power one or more systems of the vehicle 100 (e.g., an engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example implementations. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors or sensor devices, such as a Global Positioning System (GPS) 122, an inertial measurement unit (IMU) 124, a radar 126, a laser rangefinder/lidar sensor 128, a camera 130, a steering sensor 123, and a throttle/brake sensor 125, among other possible sensors. In some implementations, the sensor system 104 may also include sensors configured to monitor internal systems of the vehicle 100 (e.g., 02 monitor, fuel gauge, engine oil temperature, brake wear).

The GPS 122 may include a transceiver operable to provide information regarding the position of vehicle 100 with respect to the Earth. The IMU 124 may have a configuration that uses one or more accelerometers and/or gyroscopes and may sense position and orientation changes of vehicle 100 based on inertial acceleration. For example, the IMU 124 may detect a pitch and yaw of the vehicle 100 while the vehicle 100 is stationary or in motion.

The radar 126 may represent one or more systems configured to use radio signals to sense objects, including the speed and heading of the objects, within the local environment of the vehicle 100. As such, the radar 126 may include antennas configured to transmit and receive radio signals. In some implementations, the radar 126 may correspond to a mountable radar unit or system configured to obtain measurements of the surrounding environment of the vehicle 100.

The laser rangefinder/lidar 128 may include one or more laser sources, a laser scanner, and one or more detectors or sensors, among other system components, and may operate in a coherent mode (e.g., using heterodyne detection) or in an incoherent detection mode. In some embodiments, the one or more detectors or sensor of the laser rangefinder/lidar 128 may include one or more photodetectors. In some examples, the photodetectors may be capable of detecting single photon avalanche diodes (SPAD). Further, such photodetectors can be arranged (e.g., through an electrical connection in series) into an array (e.g., as in a silicon photomultiplier (SiPM)).

The camera 130 may include one or more devices (e.g., a still camera or video camera) configured to capture images of the environment of the vehicle 100. In some examples, the camera may include an image sensor configured to capture a series of images (e.g., image frames) in a time-sequential manner. The image sensor may capture images at a particular rate or at a particular time interval between successive frame exposures.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle)

and brake pedal, electrical signal representing the angle of the gas pedal (throttle) and brake pedal, the angle of the throttle body, and the pressure that at least one brake pad is applying to a rotor of the vehicle 100. In other implementations, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate vehicle 100, which may involve using friction to decelerate the wheels/tires 121. In some implementations, brake unit 136 may convert kinetic energy of the wheels/tires 121 to electric current for subsequent use by a system or systems of the vehicle 100.

The sensor fusion algorithm 138 of the control system 106 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 of the control system 106 may include hardware and software operable to process and analyze images in an effort to determine objects, environmental objects (e.g., stop lights, road way boundaries, etc.), and obstacles. As such, the computer vision system 140 may use object recognition, Structure From Motion (SFM), video tracking, and other algorithms used in computer vision, for instance, to recognize objects, map an environment, track objects, estimate the speed of objects, etc.

The navigation/pathing system 142 of the control system 106 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the implementation, the computer system 112 could be operable to monitor many aspects of the vehicle 100 and its subsystems. In some implementations, the computer system 112 may disable some or all functions of the vehicle 100 based on signals received from the sensor system 104.

The components of the vehicle 100 could be configured to work in an interconnected fashion with other components within or outside their respective systems. For instance, in an example implementation, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar unit 126 may also provide information about the surroundings of the vehicle. In other words, a combination of various sensors (which could be termed input-indication and output-indication sensors) and the computer system 112 could interact to provide an indication of an input provided to control a vehicle or an indication of the surroundings of a vehicle.

In some implementations, the computer system 112 may make a determination about various objects based on data that is provided by systems other than the radio system. For example, the vehicle 100 may have lasers or other optical sensors configured to sense objects in a field of view of the sensors (e.g., vehicle). The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
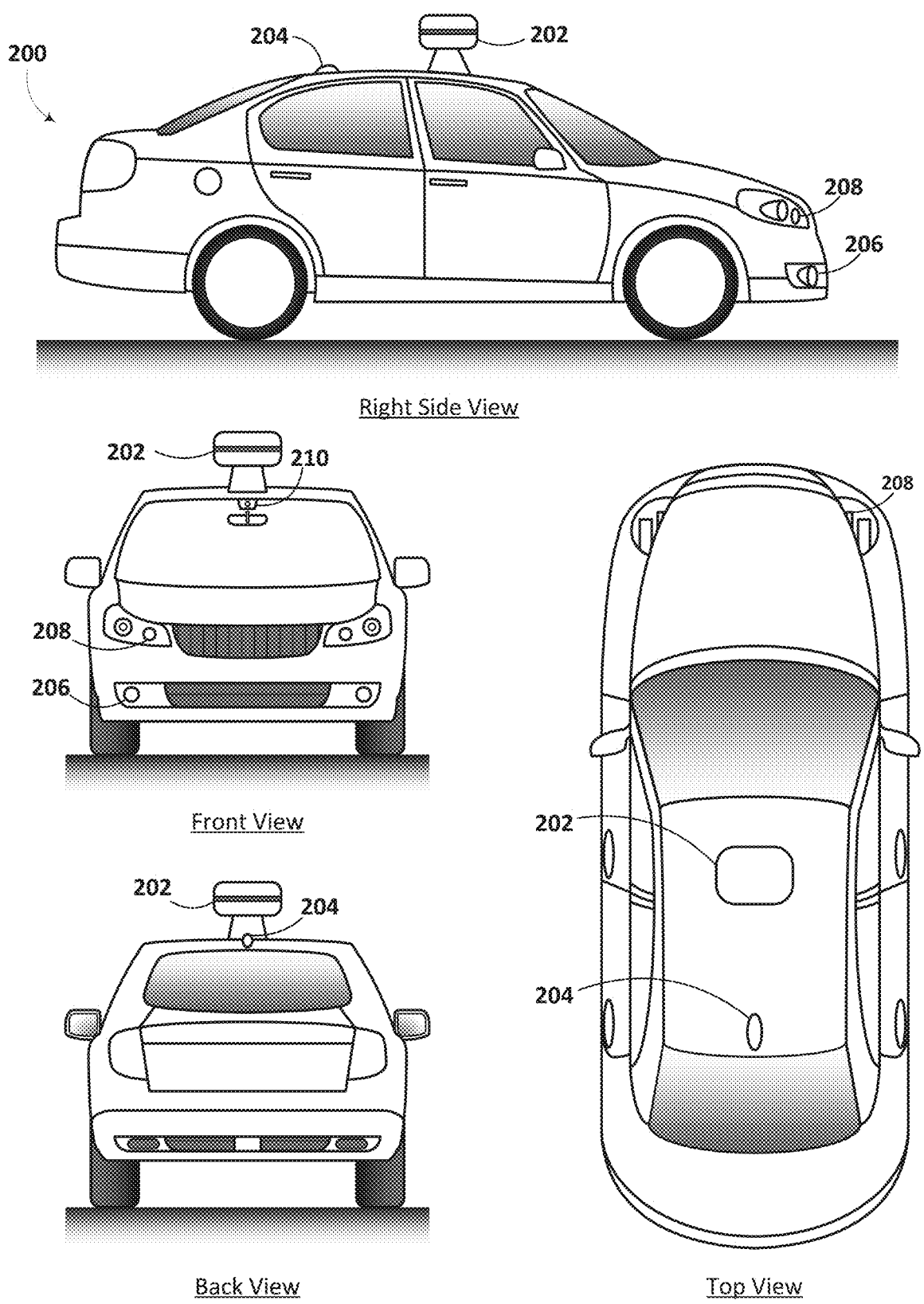
FIG. 2 is a conceptual illustration of a configuration of a vehicle, according to an example implementation.

FIG. 2 depicts an example physical configuration of the vehicle 200, which may represent one possible physical configuration of vehicle 100 described in reference to FIG. 1. Depending on the implementation, the vehicle 200 may include the sensor unit 202, the wireless communication system 204, the radio unit 206, the deflectors 208, and the camera 210, among other possible components. For instance, the vehicle 200 may include some or all of the elements of components described in FIG. 1. Although the vehicle 200 is depicted in FIG. 2 as a car, the vehicle 200 can have other configurations within examples, such as a truck, a van, a semi-trailer truck, a motorcycle, a golf cart, an off-road vehicle, or a farm vehicle, among other possible examples.

The sensor unit 202 may include one or more sensors configured to capture information of the surrounding environment of the vehicle 200. For example, the sensor unit 202 may include any combination of cameras, radars, LIDARs, range finders, radio devices (e.g., Bluetooth and/or 802.11), and acoustic sensors, among other possible types of sensors.

In some implementations, the sensor unit 202 may include one or more movable mounts operable to adjust the orientation of sensors in the sensor unit 202. For example, the movable mount may include a rotating platform that can scan sensors so as to obtain information from each direction around the vehicle 200. The movable mount of the sensor unit 202 may also be movable in a scanning fashion within a particular range of angles and/or azimuths.

In some implementations, the sensor unit 202 may include mechanical structures that enable the sensor unit 202 to be mounted atop the roof of a car. Additionally, other mounting locations are possible within examples.

The wireless communication system 204 may have a location relative to the vehicle 200 as depicted in FIG. 2, but can also have different locations within implementations. The wireless communication system 200 may include one or more wireless transmitters and one or more receivers that may communicate with other external or internal devices. For example, the wireless communication system 204 may include one or more transceivers for communicating with a user's device, other vehicles, and roadway elements (e.g., signs, traffic signals), among other possible entities. As such, the vehicle 200 may include one or more vehicular communication systems for facilitating communications, such as dedicated short-range communications (DSRC), radio frequency identification (RFID), and other proposed communication standards directed towards intelligent transport systems.

The camera 210 may have various positions relative to the vehicle 200, such as a location on a front windshield of vehicle 200. As such, the camera 210 may capture images of the environment of the vehicle 200. As illustrated in FIG. 2, the camera 210 may capture images from a forward-looking view with respect to the vehicle 200, but other mounting locations (including movable mounts) and viewing angles of the camera 210 are possible within implementations. In some examples, the camera 210 may correspond to one or more visible light cameras. Alternatively or additionally, the camera 210 may include infrared sensing capabilities. The camera 210 may also include optics that may provide an adjustable field of view.

Figure 3:
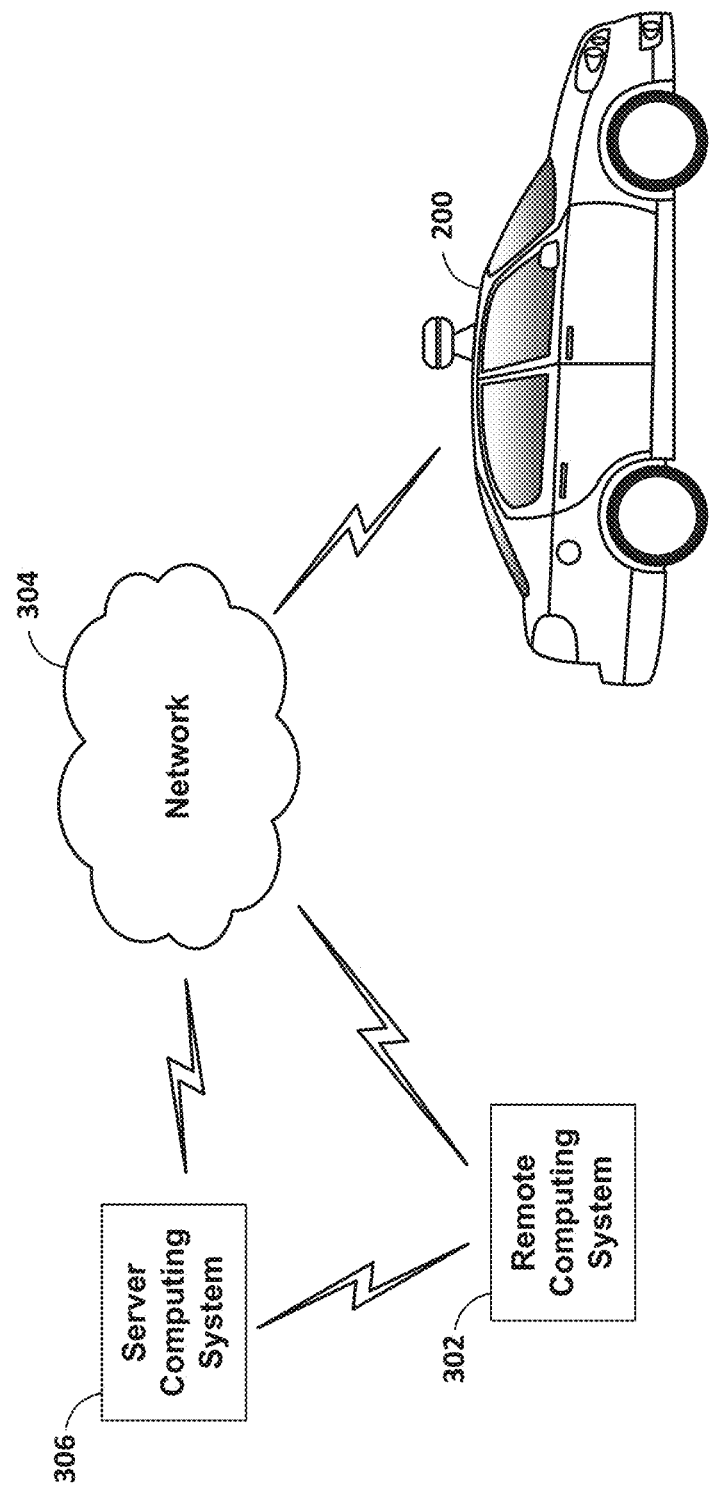
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has a wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some implementations, operations described herein that are performed by the remote computing system 302 may be additionally or alternatively performed by the vehicle 200 (i.e., by any system(s) or subsystem(s) of the vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. For example, a computing or sensor system (e.g., the remote computing system 302, the server computing system 306, or a computing system local to the vehicle 200) may operate sensors or sensor devices to capture sensor information of the environment of an autonomous vehicle. In general, at least one computing device or system will be able to analyze the sensor information and possibly control the autonomous vehicle.

In some implementations, to facilitate autonomous operation, a vehicle (e.g., the vehicle 200) may receive data representing objects in an environment in which the vehicle operates (also referred to herein as "environment data") in a variety of ways. A sensor or computing system on the vehicle may provide the environment data representing objects of the environment. For example, the vehicle may have various sensors, including a camera, a radar sensor, a laser range finder/lidar sensor, an image sensor, a microphone, and other sensors. Each of these sensors may communicate data to a computing device (e.g., a processor) in the vehicle about information each respective sensor receives.

In some implementations, the computing device (e.g., a controller or processor) or computing system may be able to combine information from the various sensors in order to make further determinations of the environment of the vehicle. For example, the processing system may combine data from a lidar sensor or a radar sensor and an image sensor to determine if another vehicle or pedestrian is in front of the autonomous vehicle. In other implementations, other combinations of sensor data may be used by the computing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The computing or processing system of the vehicle may alter the control of the vehicle based on the environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this operation, the vehicle may analyze the environment data representing objects of the environment to determine at least one object having a detection confidence below a threshold. A computing device or processor in the vehicle may be configured to detect various objects of the environment based on environment data from various sensors. For example, in one implementation, the computing device may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some implementations, the environment data may be received from a camera and include image or video data. In other implementations, the environment data may be received from a lidar sensor. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
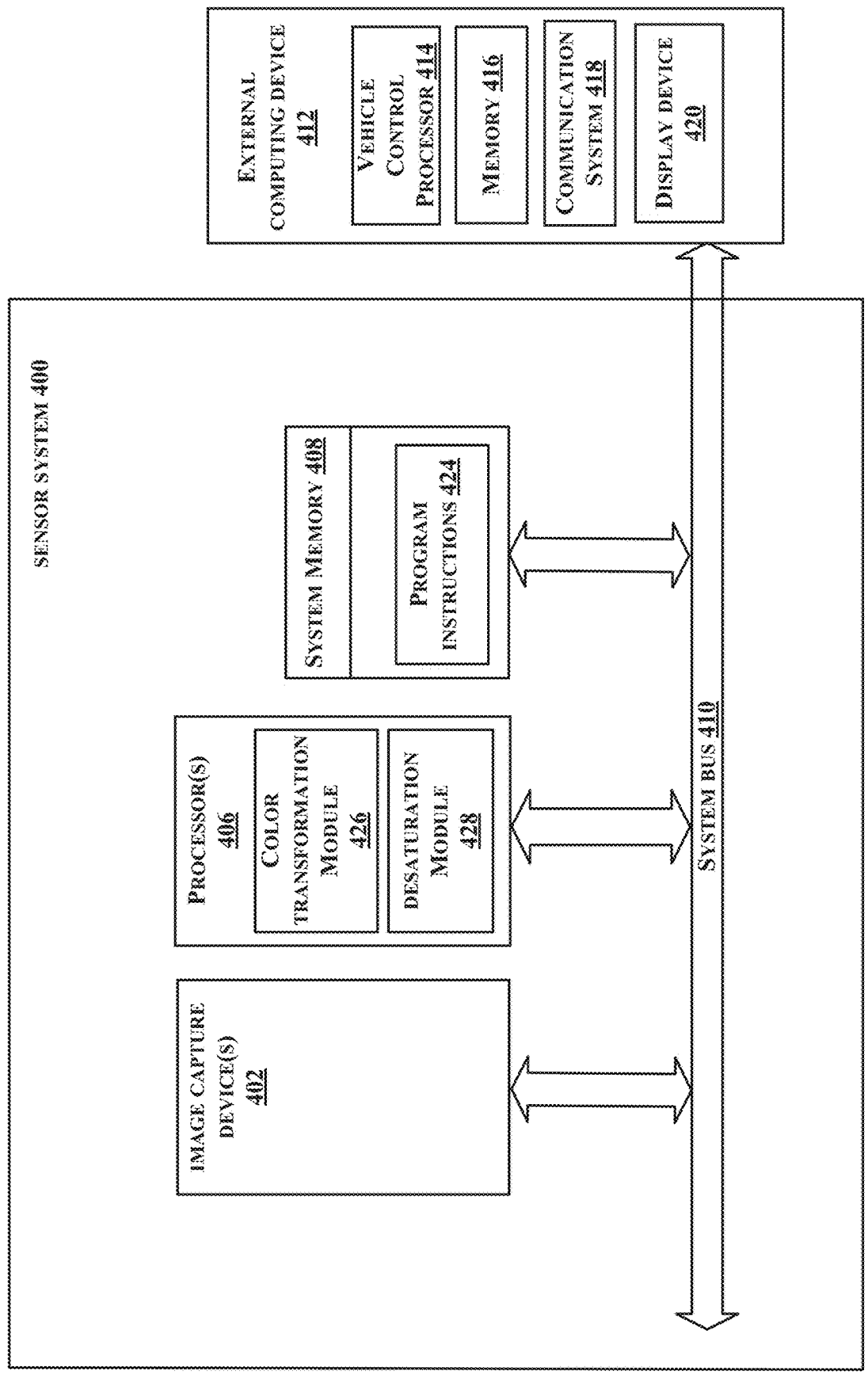
FIG. 4 is a simplified block diagram depicting components of a sensor system, according to an example implementation.

FIG. 4 is a simplified block diagram depicting components of an example sensor system 400 (e.g., a camera system) of a vehicle for capturing sensor information about an environment surrounding the vehicle. In some examples, the vehicle may include more than one sensor system. For example, the vehicle may include a sensor system mounted to the top of the vehicle in a sensor dome and may include another sensor system located behind the windshield of the vehicle. In other examples, the various sensor systems may be located in various different positions throughout the vehicle.

As shown in FIG. 4, the sensor system 400 may include one or more image capture devices 402, one or more processors 406, and a system memory 408. The image capture devices 402 of the sensor system 400 may be configured to capture or acquire image data and transmit the image data to the components and/or systems of the vehicle. In some implementations, the processors 406 may comprise image processors and the system memory 408 may or may not be located within the same physical housing as the processors 406. Although various components of the sensor system 400 are shown as distributed components, it should be understood that any of such components may be physically integrated and/or distributed according to a desired configuration of the sensor system 400.

Further, the sensor system 400 may include a system bus 410. Although depicted as a single bus, the system bus 410 may be composed of multiple buses. The system bus 410 may be implemented using any suitable communication technology and may include connection technology that allows multiple components to share the system bus 410. For example, the system bus 410 may be configured to enable the transfer of image data (e.g., images) between the image capture devices 402, the processors 406, and/or the system memory 408. Further, the system bus 408 may communicatively couple the sensor system 400 with an external computing device 412. For example, the system bus 410 may enable the image capture devices 402 and/or the processors 406 to send sensor data (e.g., image data) to the external computing device 412.

The external computing device 412 may include a vehicle-control processor 414, a memory 416, a communication system 418, a display device 420, and other components. The external computing system 412 may be located in the autonomous vehicle. The communication system 418 of the external computing device 412 may be configured to communicate data between the vehicle and a remote device or computer server. The memory 416 of the external computing device 412 may have a larger capacity than the system memory 408 of the sensor system 400. The memory 416 may also be used for longer term storage than the system memory 408. In some examples, sensor data received by the external computing device 412 may be used by a navigation system (e.g., a navigation processor) of the vehicle and/or may be rendered on the display device 420. The display device 420 may include any suitable device for displaying sensor data (e.g., images), such as the touchscreen 148 of FIG. 1. Further, the external computing device 412 may be configured to control various operations of the sensor system 400, among other options.

The image capture devices 402 of the sensor system 400 may be configured to capture image data and transfer the image data to the processors 406 and/or the system memory 408. In some examples, the image capture devices 402 may include one or more cameras. The image capture devices 402 may be implemented using image sensors (e.g., frame-based image sensors). The image sensors of the image capture devices 402 may comprise charge coupled devices (CCD), complementary metal oxide semiconductor (CMOS) image sensors, or other suitable image sensors. The image sensors may comprise a two-dimensional grid or array of pixels or sensor elements configured to generate image data of a scene. The two-dimensional array may have a width of x pixels and a height of y pixels. In some embodiments, each image capture device 402 may include a plurality of image sensors for capturing image data (e.g., a dual image sensor).

The pixels of the image capture devices 402 may be sampled or scanned at a fixed sampling or frame rate. In one example, the pixels may be sampled one row at a time. Sampling in this way is known as a rolling shutter. Further, the pixels may be sampled in an iterative fashion by incrementally adjusting the sample row. In some examples, the iterations may be linear, that is after each row is sampled, the next row is subsequently sampled. In other examples, the sampling may be performed in different ways. For example, the pixels of the image capture devices 402 may be sampled more than one row at a time. Further, the sampling may be performed on columns in a sequential or non-sequential order.

When the pixels of the image capture devices 402 are sampled or scanned, the values associated with each pixel may be captured by the image capture device 402 and used to generate or form a two-dimensional image frame (e.g., image). The image frame may represent a plurality of pixel values, and each pixel value may correspond to a set of pixel values, such as depth values, photometric values (e.g., red-green-blue (RGB) values, intensity values, chroma values, saturation values, etc.), or a combination thereof.

The image capture devices 402 may have a particular pixel density (e.g., 40 megapixel (MP), 32 MP, 16 MP, 8 MP) as well as a color filter array (CFA) configuration to support different image processing techniques (e.g., inclusion of a Bayer CFA to support red, green, and blue (RGB) image processing and exclusion of a CFA to support monochromatic-image processing). For example, the image capture devices 402 may include CFAs that overlay the pixels of the image captured device 402 and limit intensities, as associated with color wavelengths, of light recorded through the pixel elements. The CFAs may comprise Bayer CFAs, which filter light according to a red wavelength, a blue wavelength, and a green wavelength. Light from the environment, when filtered through the Bayer CFAs, may generate an image or image frame that can be referred to as a Bayer image or a Bayer image frame.

During operation, the image capture devices 402 may be configured to capture image data (e.g., images) of a scene. The pixels or sensor elements of the image capture devices 402 may receive light by way of an optical system and convert the light into raw color values (e.g., color coordinates) in color spaces associated with the image capture devices 402. In some embodiments, the optical systems of the image capture devices 402 may separate the light into red, green, and blue light rays using color filters and may focus the separated red, green, and blue rays on the pixels of the image capture devices 402. Each image pixel may sense the red, green, and blue light rays and may output a raw color value that includes a red, green, and blue component or color coordinate (e.g., $R_{RAW}$, $G_{RAW}$, $B_{RAW}$) in a color space (e.g., an RGB color space) associated with the image capture device 402. Thus, the raw color values generated by the image capture devices 402 may represent colors in a device-dependent color space.

Each image capture device 402 may generate raw color values in a different color space for the same scene. Thus, the raw color values of the images generated by the image capture devices 402 may not define the same color across each image capture device without transforming or correcting the raw color values to a standard color space. Because each image capture device 402 has a device-dependent color space, the raw color values of the images output by the image capture devices 402 may be transformed or adjusted into color values in a standard or desired color space.

The image capture devices 402 may have corresponding color transformation information for transforming or converting the raw color values to color values in a standard or device-independent color space. For example, each image capture device 402 may have an associated transformation matrix (e.g., a color transformation or correction matrix) that may be used to transform or correct the raw color values of the images generated by the image capture devices 402. The color transformation matrices associated with the image capture devices may be stored in memory of the image sensor devices 402 or in the system memory 408. The color transformation matrices may be applied to the raw color values of the image data (e.g., images) captured by the image capture devices 402 as further described below.

The color transformation matrices associated with the image captured devices 402 may be determined using calibration techniques or processes performed by a device manufacturer or device vendor. In some embodiments, the color transformation matrices may be determined using calibration techniques at any suitable time during the service life of the image capture devices 402 (e.g., during initial calibration when the image capture devices 402 are first attached to the vehicle and for any later recalibrations that may be required during operation of the image capture devices 402). The color transformation matrices may be provided or transmitted to the processor 406 as metadata of the image data generated by the image capture devices 402.

Referring still to FIG. 4, the system memory 408 of the sensor system 400 may store information including sensor data (e.g., image data) that may be retrieved, manipulated, and/or stored by the processors 406. For example, the system memory 408 may store image data from each of the image capture devices 402. Further, the system memory 408 may store color transformation information (e.g., color correction information) associated with the image capture devices 402. The color transformation information may include one or more color transformation matrices (e.g., color correction matrices). The color transformation matrices may include coefficients (e.g., transformation or correction values) that may be applied to the raw color values of images in order to transform or convert (i.e., correct) the raw color values to color values in a standard or desired color space. The coefficients of the color transformation matrices may be selected or determined during a calibration process performed by a device manufacturer or may be determined using calibration techniques during the operation of the image capture devices 402. In some examples, the color correction matrix may include an M×N transformation or correction matrix as further described below.

The system memory 408 of may be larger than the internal memory included in the processor 406 and may act as the main memory for the sensor system 400. In some examples, the system memory 408 may be located outside of or external to an integrated circuit (IC) containing the processors 406. The system memory 408 may comprise any type of volatile or non-volatile memory technology, such as dynamic random access memory (DRAM), synchronous dynamic random access memory (SDRAM), or Flash memory. The system memory 408 may also be implemented as an electrically erasable programmable read only memory (EEPROM) or any other suitable memory device.

In some examples, the system memory 408 may be a memory cache or buffer to temporarily store sensor data. In some implementations, the system memory 408 may be part of the image captured device 402. Further, the system memory 408 may include program instructions 424 that are executable by the processors 406 to facilitate the various functions described herein. For example, image processing and motion estimation algorithms may be stored in the system memory 408 and executed by the processors 406.

As shown in FIG. 4, the processors 406 of the sensor system may be communicatively coupled to the image capture devices 402 and the system memory 408. The processors 406 may include, but are not limited to, microprocessors, microcontrollers, digital signal processors (DSP), image processors, or any combination thereof. The processors 406 may also include one or more image processing pipelines to perform image processing operations on the image data generated by the image capture devices 402. For example, the processors 406 may perform defective pixel detection and correction, scaling, lens shading correction, demosaicing, black level subtraction (e.g., to produce photometrically linear intensity estimates), image enhancement, noise reduction, image stabilization (e.g., to compensate for movement of a camera), object recognition (e.g., finding a specific object in image data), as well as other operations. In addition, the processors 406 may apply any of a number of data reduction techniques to the sensor data, such as redundancy avoidance, lossless compression, and lossy compression.

The processors 406 may be configured to receive image data from the image capture devices 402 and/or the system memory 408. In some embodiments, the image data may be received by the processors 406 in real-time directly from the image capture devices 402. In other embodiments, the image data may be received in an offline manner and stored in the system memory 408 for later retrieval. The processors 406 may generate or form two-dimensional image frames (e.g., images) based on image data received from the image capture devices 402.

As illustrated, the processors 406 may include a color transformation module 426 and a desaturation module 428. In some implementations, the color transformation module 426 and the desaturation module 428 may be combined in a single module. The color transformation module 426 may receive image data generated from the image capture devices 402 and transform or convert the image data to image data in different color spaces. The color values of the image data captured by the image capture devices 402 may vary for each image sensor of the image capture devices 402 and the color spaces of the captured image data may differ from image capture device to image capture device (e.g., each image capture device may output color values in a different color space). Thus, the color transformation module 426 may be configured to transform or convert the image data captured by the image capture devices to image data in a standard or common color space (e.g., a standard RGB color space). For example, the color transformation module 426 may receive raw color values (e.g., color coordinates) of images in a device-dependent color space from the image capture devices 402 and transform or convert the raw color values into color values in a device-independent color space (e.g., a standard RGB space).

The color transformation module 426 may use color transformation information (e.g., color correction information) to transform or convert the raw color values of images in a device-dependent color space to color values in a device-independent color space. The color transformation module 426 may receive the color transformation information from the image capture devices 402 or may retrieve the color transformation information from the system memory 408. The color transformation module 426 may apply the color transformation information (e.g., a color transformation or correction matrix) to the raw color values of image data generated by the image capture devices 402. For example, the color transformation module 426 may perform operations that include multiplication between the color transformation information and the color values of the images captured by the image capture devices 402 as further described below.

The color transformation information may include one or more transformation matrices (e.g., 3×3 transformation matrices, multiplication transformation matrices, normalization transformation matrices, etc.), gamma curve transformations, linear and non-linear transformations, and/or any other suitable color space transformation matrices to convert raw color values to color values in a standard color space (e.g., a standard RGB color space). The color transformation information may include at least one color transformation matrix (e.g., a color correction matrix) for each image capture device 402. For example, the color transformation information may include a first color transformation matrix associated with a first image capture device and a second color transformation matrix associated with a second image capture device.

The color transformation matrices may include one or more N×M transformation matrices where N corresponds to a dimension of a device-dependent color space (e.g., 3 for an RGB color space) and M corresponds to a dimension of a device-independent color space (e.g., 3 for a standard RGB color space). Each color transformation matrix may include coefficients for transforming the raw color values in a color space associated with an image capture device 402 (e.g., a device-dependent color space) into color values in a standard or device-independent color space.

The color transformation module 426 of the processors 406 may be configured to apply a color transformation matrix to the raw color values of images captured by the image capture devices 402 to generate color values in a standard color space. To apply the color transformation matrix, the color transformation module 426 may be configured to perform matrix multiplication between the color transformation matrix and the raw color values of the images captured by the image capture devices 402 to generate the corrected or transformed color values of the image. When the color transformation module 426 transforms the raw color values of the images captured by the image capture device, the color transformation module may not clip the resulting transformed color values. Thus, the color space of the color values may provide all colors from the combination of red, green, and blue colors. In some implementations, the color adjustment module may perform operations that include matrix multiplication between a 3×3 color correction matrix and a 3×L pixel data matrix, where L corresponds to the dimension of the pixel array in the image sensor.

In some embodiments, the color transformation module 426 may apply a first color transformation matrix to the raw color values of the images received from a first image capture device to generate color values of the images in a standard color space. Similarly, the color transformation module 426 may apply a second color transformation matrix to the raw color values of images received from a second image capture device to generate color values of the images in the standard color space. Thus, the raw color values representing colors of the images received from the image capture devices may be transformed or converted to corresponding color values representing the same colors in a standard color space.

In some implementations, the standard color space may be a standard RGB (sRGB) color space where the color of a pixel of the image is defined as a combination of red, green, and blue colors or other suitable color values. For example, the color values for the sRGB color space may be obtained according to the following equation: sRGB=RGB*Color Transformation Matrix. Another example of the standard color space is a HIS color space, where H stands for hue, S stands for saturation, and I stands for intensity (brightness). After the color transformation module 426 produces the color values in the standard color space, the color transformation module 426 may provide the transformed color values of the images to the desaturation module 426.

The desaturation module 428 of the processors 406 may receive outputs from the color transformation module 426. For example, the desaturation module 428 may receive the transformed color values of the images in a color space (e.g., a standard or device-independent color space) from the color transformation module 426. In some implementations, the desaturation module 428 may retrieve the desaturation information from the system memory 408. The desaturation module 428 may use desaturation information to desaturate the transformed color values of images. For example, the desaturation module 428 may adjust the saturation levels of the transformed color values of the images using the desaturation information.

The desaturation module 428 may be configured to apply the desaturation information to the transformed color values of the images received from the color transformation module 426. The desaturation information may include one or more desaturation matrices. For example, the desaturation matrices may include one or more N×M transformation matrices where N corresponds to a dimension of the device-dependent color space and M corresponds to a dimension of the device-independent color space. To apply the desaturation matrix to the transformed color values, the desaturation module 428 may be configured to multiply the desaturation matrix with the transformed color values of the images. For example, a desaturation module may perform matrix multiplication between the desaturation matrix and the transformed color value of the image. In one implementation, the desaturation matrix may be defined by the following matrix:

$$D = \begin{pmatrix} a & b & b \\ b & a & b \\ b & b & a \end{pmatrix}$$

In the desaturation matrix, the coefficients a and b may be defined by: $a=1-2k/3$ and $b=k/3$, with $k \in [0 \ldots 1]$. The desaturation matrix D may have values between an identity matrix $I_3$ (e.g., identity matrix of size 3) and $\frac{1}{3}*1_3$, where $1_3$ may be a square matrix composed of ones and may have a size of 3×3. Thus, when $k=0$, $D=I_3$ and when $k=1$, then $D=1_3$. Further, the desaturation matrix D may have the particular properties, such as the grey pixels may remain unchanged (e.g., R=G=B) and the pixel brightness may stay the same (e.g., R+G+B). This may be due to the fact that each column of the desaturation matrix D may be the unit sum of: $a+b+b=1-2k/3+k/3+k/3=1$.

In some implementations, the desaturation matrix D may be modified based on lighting conditions. Further, the desaturation matrix (D) may be pre-multiplied with the color transformation matrix so that raw color values of images may be corrected using matrix: M=color transformation matrix*desaturation matrix (D). The desaturation module may provide the desaturation color values of the images to the display device 420. The display device 420 may render the images based on the desaturation color values.

Figure 5:
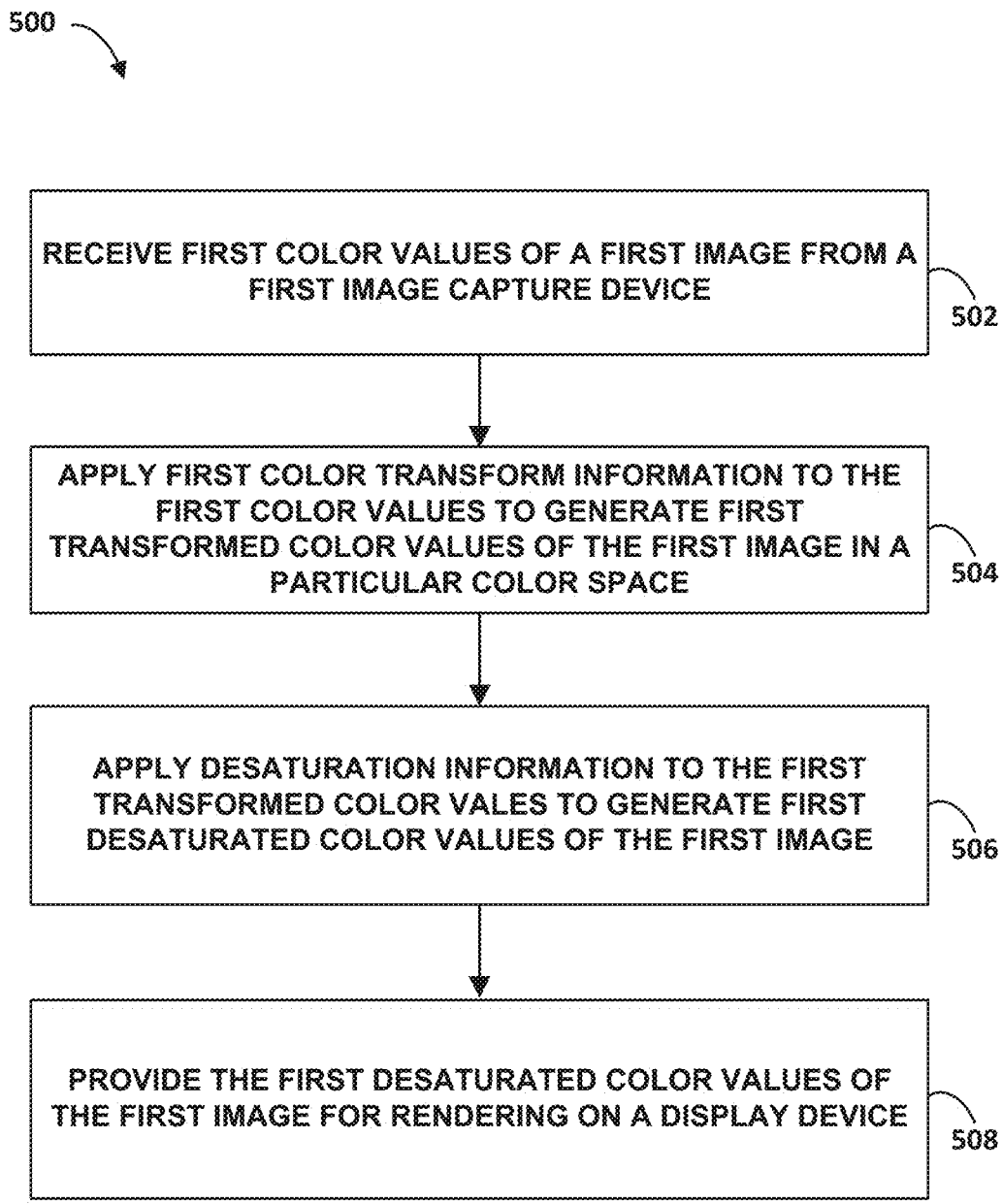
FIG. 5 is a flow chart of a method, according to an example implementation.

FIG. 5 is a flow chart of a method 500 for rendering color images, according to an example implementation. Other example methods for rendering color images may exist as well. The method 500 represents an example method that may include one or more operations as depicted by one or more blocks 502-508, each of which may be carried out by any of the systems shown in FIGS. 1-4, among other possible systems. In an example implementation, a computing system (e.g., a sensor system 104, a control system 106, remote computing system 302, server computing system 306, or sensor system 400) may perform the illustrated operations, although in other implementations, one or more other systems can perform some or all of the operations.

Those skilled in the art will understand that the flow chart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

At block 502, the method 500 includes receiving first color values of a first image from a first image capture device. The first color values may represent colors in a first color space. In some implementations, a computing device or system (e.g., the processor 406 of FIG. 4) may be configured to receive image data from image capture devices (e.g., the event capture devices 402 of FIG. 4). The image data may include color values (e.g., raw color values) of the image in a color space. In some implementations, the color space may be a standard or device-independent color space. The computing system may compensate or correct for color differences between the image and other images received by the computing device from other image capture devices. The computing device may receive the color values of the image in real-time and the color value may be stored in various types of memory or within a cloud. Further, the computing device may receive event data wirelessly or through a wired route.

At block 504, the method 500 includes applying first color transformation information to the first color values to generate first transformed color values of the first image in a particular color space. The computing device may be configured to transform or convert the image data captured by the image capture devices to image data in a particular color space. For example, the computing may receive raw color values (e.g., color coordinates) of images in a device-dependent color space from the image capture devices and transform or convert the raw color values into color values in a standard or device-independent color space (e.g., a standard RGB color space).

The computing device may use color transformation information (e.g., color correction information) to transform or convert the raw color values of images in a device-dependent color space to color values in a device-independent color space. For example, the computing device may apply the color transformation information (e.g., a color transformation or correction matrices) to the raw color values of image data generated by the image capture devices. The color transformation information may include at least one color transformation matrix (e.g., color correction matrix) for each image capture device.

The computing device may be configured to apply a color transformation matrix to the raw color values of images captured by the image capture devices to generate color values in a standard color space. To apply the color transformation matrix to the raw color values, the computing device may be configured to perform matrix multiplication between the color transformation matrix and the raw color values of the images captured by the image capture devices to generate the corrected or transformed color values of the image. In some implementations, the computing device may perform operations that include matrix multiplication between a 3×3 color correction matrix and a 3×L pixel data matrix, where L corresponds to the dimension of the pixel array in the image sensor. When the computing device transforms the raw color values of the images captured by the image capture devices, the color transformation module may not clip the resulting transformed color values. Thus, the color space of the color values may provide all colors from the combination of red, green, and blue colors or any other suitable color values.

In some embodiments, the computing device may apply a first color transformation matrix to the raw color values of images received from a first image capture device to generate color values of the images in a standard color space. Similarly, the computing device may apply a second color transformation matrix to the raw color values of images received from a second image capture device to generate color values of the images in the standard color space. Thus, the raw color values representing colors of the images received from the image capture devices may be transformed or converted to corresponding color values representing the same colors in a standard color space.

At block 506, the method includes applying desaturation information to the first transformed color values to generate first desaturated color values of the first image. The computing device may use desaturation information to desaturate the transformed color values of the images. For example, the computing device may adjust the saturation levels of the transformed color values of the images using the desaturation information. In some implementations, the method may apply first color transformation information to the first color value at block 504 and may apply desaturation information to the first transformed color values to generate first desaturated color values of the first image at substantially the same time.

The computing device may be configured to apply the desaturation information to the transformed color values of the images. The desaturation information may include one or more desaturation matrices. The desaturation matrices may include one or more N×M transformation matrices where N corresponds to a dimension of a device-dependent color space and M corresponds to a dimension of a device-independent color space. To apply the desaturation matrix, the computing device may be configured to multiply the desaturation matrix with the transformed color values of the images. For example, the desaturation module may perform matrix multiplication between the desaturation matrix and the transformed color value of the image.

At block 508, the method includes providing the first desaturated color values of the first image for rendering on a display device. The computing device may transmit or provide the first desaturated color values of the first image for displaying a representation of the first image on the display device.

Figure 6:
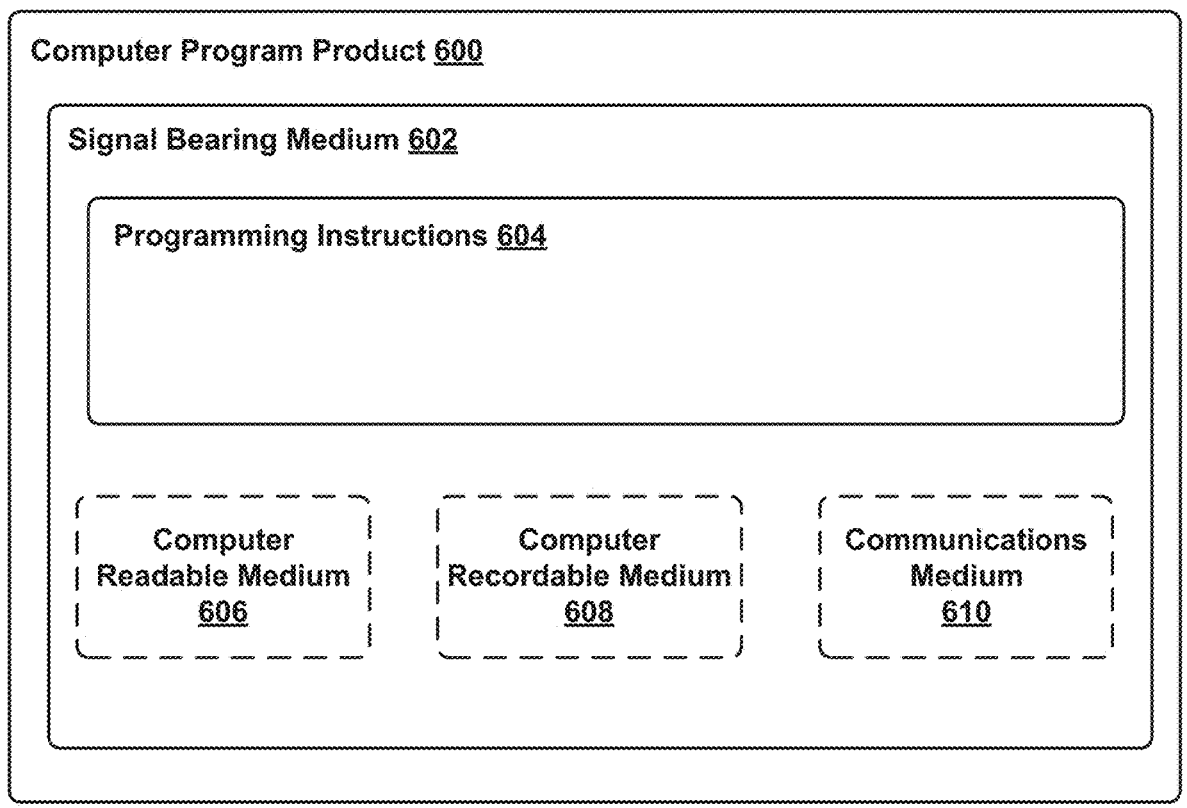
FIG. 6 is a schematic diagram of a computer program, according to an example implementation.

FIG. 6 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 600 is provided using signal bearing medium 602, which may include one or more programming instructions 604 that, when executed by one or more processors may provide functionality or portions of the functionality described above with respect to FIGS. 1-4. In some examples, the signal bearing medium 602 may encompass a non-transitory computer-readable medium 606, such as, but not limited to, a hard disk drive, a CD, a DVD, a digital tape, memory, components to store remotely (e.g., on the cloud) etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Similarly, the signal bearing medium 602 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 or remote computing system 302 and perhaps server computing systems of FIG. 3 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving, by one or more processors, first color values of a first image from a first image capture device, wherein the first color values represent colors in a first color space, and wherein the first image capture device is configured to be coupled to a vehicle;
applying, by the one or more processors, a first transformation matrix to the first color values to generate first transformed color values of the first image in a particular color space;
applying, by the one or more processors, a desaturation matrix to the first transformed color values to generate first desaturated color values of the first image, wherein the desaturation matrix includes a plurality of coefficients, and wherein a sum of the coefficients for each column of the desaturation matrix equals 1; and
providing the first desaturated color values of the first image for rendering on a display device.

2. The method of claim 1, further comprising:
receiving, by the one or more processors, second color values of a second image from a second image capture device, wherein the second color values represent colors in a second color space;
applying, by the one or more processors, a second transformation matrix to the second color values to generate second transformed color values of the second image in the particular color space; and
applying, by the one or more processors, the desaturation matrix to the second transformed color values to generate second desaturated color values of the second image; and
providing the second desaturated color values of the second image for rendering on the display device.

3. The method of claim 1, further comprising receiving the first transformation matrix for converting the first color values to the first transformed color values in the particular color space.

4. The method of claim 1, further comprising determining the first transformation matrix.

5. The method of claim 1, further comprising capturing the first image by the first image capture device, wherein the image represents a scene.

6. The method of claim 1, wherein the first color values comprise raw color values.

7. The method of claim 1, wherein each of the first color values comprises a red value, a green value, and a blue value.

8. The method of claim 1, wherein the first color space comprises a device-dependent color space, and wherein the particular color space comprises a device-independent color space.

9. The method of claim 1, wherein the particular color space comprises a standard color space or a standard RGB color space.

10. The method of claim 1, wherein each of the plurality of coefficients has a value defined by $1-2k/3$ or $k/3$, wherein $0 \le k \le 1$.

11. The method of claim 1, wherein the first transformed color values are generated without clipping.

12. The method of claim 10, wherein the coefficients along a diagonal of the desaturation matrix are defined by $1-2k/3$, and wherein the off-diagonal coefficients of the desaturation matrix are defined by $k/3$.

13. The method of claim 1, wherein applying the first transformation matrix to the first color values includes calculating a product of the first transformation matrix and the first color values.

14. The method of claim 1, further comprising modifying at least one value of the coefficients of the desaturation matrix based on lighting conditions.

15. The method of claim 2, further comprising receiving the second transformation matrix for converting the second color values to the second transformed color values in the particular color space, wherein the second color values comprises raw color values, and wherein the second color space comprises a second device-dependent color space.

16. The method of claim 2, wherein each of the second color values represents a color in a device-dependent color space.

17. An apparatus comprising:
a memory;
at least one processor configured to:
- receive first color values of a first image from a first image capture device, wherein the first color values represent colors in a first color space, and wherein the first image capture device is configured to be coupled to a vehicle;
- apply a first transformation matrix to the first color values to generate first transformed color values of the first image in a particular color space;
- apply a desaturation matrix to the first transformed color values to generate first desaturated color values of the first image, wherein the desaturation matrix includes a plurality of coefficients, and wherein a sum of the coefficients for each column of the desaturation matrix equals 1; and
- provide the first desaturated color values of the first image for rendering on a display device.

18. The apparatus of claim 17, wherein the at least one processor is further configured to:
- receive second color values of a second image from a second image capture device, wherein the second color values represent colors in a second color space;
- apply a second transformation matrix to the second color values to generate second transformed color values of the second image in the particular color space; and
- apply the desaturation matrix to the second transformed color values to generate second desaturated color values of the second image; and
- provide the second desaturated color values of the second image for rendering on the display device.

19. The apparatus of claim 17, wherein the first color values comprise raw color values, wherein the first color space comprises a device-dependent color space, and wherein the particular color space comprises a device-independent color space.

20. A non-transitory computer-readable medium storing instructions, the instructions being executable by one or more processors to perform operations comprising:
- receiving first color values of a first image from a first image capture device, wherein the first color values represent colors in a first color space, and wherein the first image capture device is configured to be coupled to a vehicle;
- applying a first transformation matrix to the first color values to generate first transformed color values of the first image in a particular color space;
- applying a desaturation matrix to the first transformed color values to generate first desaturated color values of the first image, wherein the desaturation matrix includes a plurality of coefficients, and wherein a sum of the coefficients for each column of the desaturation matrix equals 1; and
- providing the first desaturated color values of the first image for rendering on a display device.

* * * * *